(12) United States Patent
Uras

(10) Patent No.: US 11,040,682 B1
(45) Date of Patent: Jun. 22, 2021

(54) BLAST DETECTION AND SAFETY DEPLOYMENT SYSTEM AND METHOD FOR USING THE SAME

(71) Applicant: Paradigm Research and Engineering, LLC, Ann Arbor, MI (US)

(72) Inventor: Mehmet Uras, Ann Arbor, MI (US)

(73) Assignee: Paradigm Research and Engineering, LLC

( * ) Notice: Subject to any disclaimer, the term of this patent is extended or adjusted under 35 U.S.C. 154(b) by 0 days.

(21) Appl. No.: 16/744,652

(22) Filed: Jan. 16, 2020

Related U.S. Application Data

(63) Continuation of application No. 15/464,870, filed on Mar. 21, 2017, now abandoned.

(60) Provisional application No. 62/311,107, filed on Mar. 21, 2016.

(51) Int. Cl.
  *B60R 21/013* (2006.01)
  *G01L 1/12* (2006.01)

(52) U.S. Cl.
  CPC ............ *B60R 21/013* (2013.01); *G01L 1/12* (2013.01)

(58) Field of Classification Search
  CPC ........ B60R 21/013; B60R 2012/01027; B60R 2012/01322; B60R 2012/01345; G01D 5/14; G01D 5/2033; G01D 5/2046; G01D 5/2086; G01L 1/12; G01L 1/122; G01L 1/125; G01L 1/127
  See application file for complete search history.

(56) References Cited

U.S. PATENT DOCUMENTS

| | | |
|---|---|---|
| 3,628,240 A | 12/1971 | Bender |
| 4,023,056 A | 5/1977 | Yamada et al. |
| 4,108,006 A | 8/1978 | Walter |
| 5,216,723 A | 6/1993 | Froeschle et al. |
| 5,220,834 A | 6/1993 | Saito et al. |
| 5,326,945 A | 7/1994 | Gotoh et al. |
| 5,416,293 A | 5/1995 | Reneau |
| 5,430,334 A | 7/1995 | Meister |
| 5,437,197 A | 8/1995 | Uras et al. |
| 5,839,096 A | 11/1998 | Lyons et al. |
| 6,025,796 A | 2/2000 | Crosby, II |
| 6,305,709 B1 | 10/2001 | Okada |
| 6,622,577 B1 | 9/2003 | Uras |
| 6,941,824 B2 | 9/2005 | Morelli et al. |

(Continued)

*Primary Examiner* — Barry Gooden, Jr.
(74) *Attorney, Agent, or Firm* — Harness, Dickey & Pierce, P.L.C.

(57) ABSTRACT

A system includes at least one sensor, an electronics module, an energy storage, and an energy harvesting module. The sensor includes a base, at least one core assembly body, a coil, and a fixed magnet. The base is displaced in accordance with an acceleration. A sensor body reacts to the acceleration. The sensor includes a magnetic circuit powered by a fixed or permanent magnet. Magnetic flux flows through the core assembly body and out of the sensor body into the base and back into the sensor body through another core assembly body. The sensor system detects the acceleration and deploys safety systems of a vehicle. Safety systems may include airbags, seatbelts, or other safety systems of the vehicle. The sensor and the system have applications in both military and civilian sectors such as landing and take of planes, protection of buildings and bridges, monitoring machinery, and harvesting energy from vibrating structures such as bridges and vehicles.

35 Claims, 5 Drawing Sheets

(56) References Cited

U.S. PATENT DOCUMENTS

| | | |
|---|---|---|
| 7,234,361 B2 | 6/2007 | Lequesne et al. |
| 7,305,882 B1 | 12/2007 | May |
| 2007/0194900 A1 | 8/2007 | Hawkins et al. |
| 2007/0249974 A1 | 10/2007 | Kim |
| 2008/0084290 A1 | 4/2008 | Hawkins |
| 2009/0114040 A1* | 5/2009 | Mizuno .................. G01L 1/125 73/862.69 |
| 2009/0153279 A1 | 6/2009 | Chen |
| 2009/0205424 A1 | 8/2009 | Roehnelt et al. |
| 2010/0011883 A1 | 1/2010 | Werber et al. |
| 2011/0006619 A1 | 1/2011 | Lee |
| 2013/0181702 A1 | 7/2013 | May |
| 2014/0224038 A1* | 8/2014 | Masuda .................. G01L 1/12 73/862.69 |
| 2014/0358377 A1 | 12/2014 | Hammerschmidt et al. |
| 2015/0323397 A1 | 11/2015 | May |
| 2016/0223370 A1 | 8/2016 | Levy et al. |
| 2016/0306183 A1 | 10/2016 | Niederer et al. |
| 2017/0093267 A1 | 3/2017 | Yuksek et al. |

* cited by examiner

BLAST DETECTION AND SAFETY DEPLOYMENT SYSTEM AND METHOD FOR USING THE SAME

CROSS-REFERENCE TO RELATED APPLICATION

This application is a continuation of U.S. patent application Ser. No. 15/464,870, filed on Mar. 21, 2017, which claims priority to U.S. provisional patent application No. 62/311,107 filed on Mar. 21, 2016. The entire disclosures of each of the above applications are incorporated herein by reference.

GOVERNMENT RIGHTS

This invention was made with Government support under Contract W56HZV-15-C-0041 awarded by the US Army Contracting Command. The Government has certain rights in the invention. Reference herein to any specific commercial company, product, process, or service by trade name, trademark, manufacturer, or otherwise, does not necessarily constitute or imply its endorsement, recommendation, or favoring by the United States Government or the Department of the Army (DoA). The opinions of the authors expressed herein do not necessarily state or reflect those of the United States Government or the DoA, and shall not be used for advertising or product endorsement purposes.

TECHNICAL FIELD

Modern combat situations are increasingly contests in asymmetric warfare or, more recently, irregular warfare. Complex and expensive military vehicles, such as armored personnel carriers, reconnaissance vehicles, light amphibious vehicles, infantry fighting vehicles, armored combat support vehicles, prime mover, truck and other transports, and tanks and like vehicles, can be and have been disabled by use of inexpensive mines and improvised explosive devices (IEDs). During an explosion of an IED or a mine, the external acceleration from the explosion is transmitted through the vehicle into the compartment, thereby injuring or disabling the occupants. The violent up and down lifting of the vehicle during an IED or mine attack can cause the occupants and sensitive equipment in the vehicle to be thrown about in the vehicle compartment and thereby injured and damaged. In addition, a mine or IED explosion can cause the vehicle to overturn, thereby further injuring the occupants and disabling the vehicle.

Military armored vehicles do not possess a satisfactory sensor system that can effectively activate passive safety systems such as air bags or pyrotechnic seat restraints to provide protection to occupants during underbody blast events. Civilian vehicles employ safety systems to minimize personnel injuries and mortalities during accidents. These safety systems may employ more robust versions of micro-electro-mechanical systems (MEMS). Generally MEMS use accelerometers to detect front and rear collisions and gyroscopes or angular rate sensors to detect pitch and yaw so that safety systems such as air bags, seat restraints, and head restraints may be employed if the pitch or yaw exceeds a predetermined value, such as, for example, in a vehicle rollover event. In addition, side impact events may be detected using pressure sensors and or accelerometers. Generally, such safety systems use any combination and number of sensors at various positons in the vehicle to determine whether and when to activate the safety systems. These systems detect the event and transmit a signal to the appropriate safety systems by the Controller Area Network Bus (CAN) which then signals the safety system(s) to activate.

Sensor systems commonly used in automotive applications would not be suitable for aforementioned military vehicles for detection of an underbody blast event and deployment of safety systems in the vehicle. Such systems often are not sufficiently durable. Such systems also do not provide the required response time needed for blast protection because peak accelerations in a blast event are much larger in magnitude and occur within a much shorter time span compared to an automotive crash. In an automotive crash, passive safety systems such as airbags are deployed 10 ms or more after initiation of a crash event. In an underbody blast event, passive safety devices must be deployed within 0.5 ms from the initiation of the event. Detection sensors, such as accelerometers and other sensors, for commonly known safety systems further require electric power and signal conditioning. The output signals of sensors for commonly known safety systems need to be highly filtered. Further, the sensitivity of sensors for commonly known systems is poor for a timely blast detection. Other known issues for sensors for commonly known systems includes drift, sensitivity to temperature and humidity changes, and robustness to survive in a blast event. In addition, a blast damaged vehicle may have no electrical power. Thus, modified commercial sensor systems are not suitable for military vehicles operating under such battle conditions.

Operation of military vehicles often occurs over rugged terrain or under battle conditions. With commercially available safety systems, ordinary military vehicle operation has resulted in many false deployments and event detection, including generating a request for assistance signal. With false event detection, a request for assistance may not be warranted by the circumstances of the vehicle operation and may require cancellation by the vehicle operators. Such actions may cause an "assistance signal fatigue" so that responders may be less sensitive to requests for assistance when the emergency is real.

Safety systems specifications for military vehicles require higher standards and characteristics compared to standard commercial counterparts. Accordingly, more advanced technologies are required to meet and exceed these specifications. For example, during a blast event, the vehicle safety systems such as airbags, seat and head restraints, or false floor systems must be deployed in a very short timeframe. The shortened time requires a sensor to detect the blast event in a timely manner and to generate a triggering signal which deploys all vehicle safety systems within a sufficiently short time. The sensor should also be able to communicate with the vehicle CAN to send an assistance signal. The sensor must not require an electrical power supply or signal conditioning, and the signal must not drift. The sensor's output must be reliable within a wide temperature and humidity changes. In addition, the sensor must be sufficiently durable and strong to tolerate the difficult terrain often covered by these vehicles, more importantly, blast events. The system must confirm the blast and have an accurate threshold for triggering the safety systems of the vehicle in a timely manner and, must also avoid false deployments resulting from rough roads, vehicle mounted weapons, human errors, misuse, and abuse.

There is a continuing need to improve blast detection and safety deployment systems in military vehicles. Such systems must be responsive to actual emergencies but not so sensitive such that ordinary motion of the vehicle will trigger an event. The system must have an accurate threshold for triggering the safety system of the vehicle and to avoid false deployments. Such an improved sensor system must be rugged, sensitive to actual events, and inexpensive.

SUMMARY

The system described herein includes a sensor and electronics as well as energy storage and energy harvesting modules. A sensor may have a base, a core, a coil, and a fixed magnet. A first position is defined where the body is spaced apart from the base thereby creating an air gap between the base and the body. A second position is defined where the body is moved towards the base, the second position occurring in response to a sufficient external acceleration applied to the base of the sensor. When the sensor is activated, a change in the magnetic flux caused by reluctance change of the air around the gap is converted by a coil to a voltage output.

In one embodiment, the sensor may also be used to harvest energy. An oscillating air gap during normal vehicle operation, or other applications that cause oscillation of the air gap generates an oscillating voltage. The energy generated during this movement can be stored for future use.

The sensor and system detect the event such as a blast, and the sensor circuitry of electronics module provides power to the safety systems of the vehicle. Electronics of the system has self-diagnostics capability, periodically tests the system, and communicates test results visually and wirelessly to the vehicle system if desired. The sensor and system as described herein are ideal for use with military vehicles or other highly sensitive vehicles. In addition to military vehicles, the sensor and system described herein have a wide variety of other applications in both military and civilian sectors. Those include, but are not limited to, monitoring landing and takeoff of planes, protecting of buildings and bridges against explosions or impacts, monitoring machinery such as engines, and harvesting energy from vibrating structures such as bridges and vehicles.

DETAILED DESCRIPTION

Figure 1:
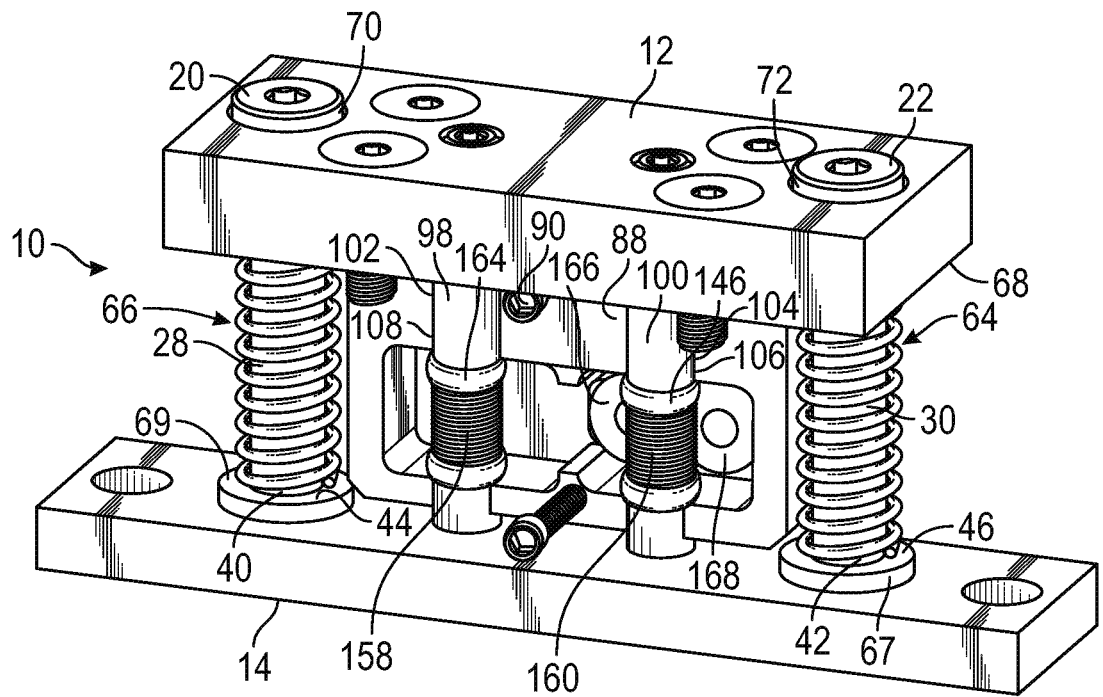
FIG. 1 illustrates a cut-a-way perspective front view of the sensor according to one or more embodiments of the present specification.
Figure 2:
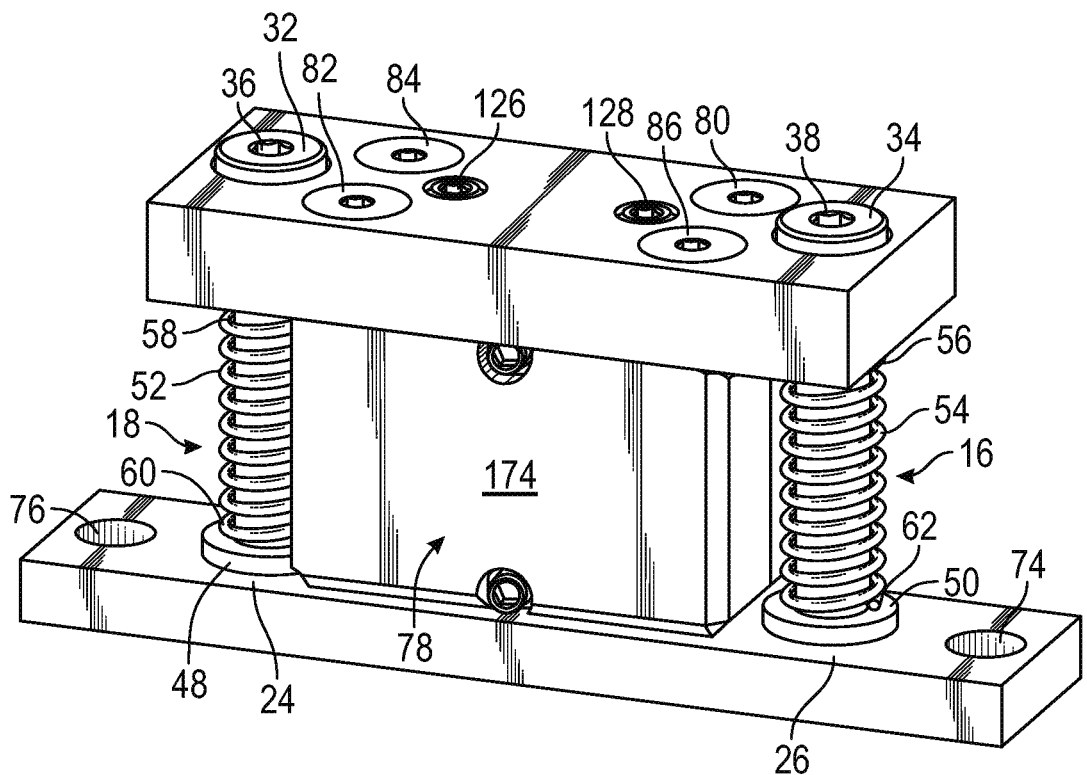
FIG. 2 illustrates a perspective front view of the sensor with the front plate in place.

Turning now to the drawings, wherein like numbers refer to like structures, and specifically to FIGS. 1 and 2, one embodiment of a sensor assembly 10 is shown, having a top portion 12 in spaced apart relation to a base portion 14. Top portion 12 and base portion 14 are held in spaced apart relation relative to each other by damper assemblies 16 and 18. Each damper assembly has first ends 20, 22 separated from second ends 24, 26, respectively, by body portion 28, 30, respectively. Each body portion 28, 30 has a predetermined length and width. While body portions 28, 30 are shown as being columns, it is also contemplated that any shape could be used.

The dampers are formed of a non-ferro-magnetic material, such as, for example and without limitation, brass, bronze, aluminum, or some resin composite. The first ends of the dampers are equipped with respective head portions 32, 34 which are configured at 36, 38 to be turned as by a tool such as, for example and without limitation, a hex key or an Allen wrench type tool. The opposing second ends of the dampers terminate in respective threaded portion 40, 42, which may be threaded or otherwise secured into respective threaded apertures 44 and 46 in the base portion in a spaced apart relation. Each damper body may be fitted with a collar or washer 48, 50 at a respective second end, and a respective biaser 52, 54 may be fitted onto each damper body. Each biaser 52, 54 resists attractive force in response to magnet 88 between core assembly 98, 100 and base portion 14. Each biaser 52, 54 has a respective first end 56, 58 and respective opposed second ends 60, 62, resists attractive force in response to magnet 88 between core assembly separated by the biaser body 64, 66, respectively. The second ends of biasers 52, 54 rest against respective collars or washers 67, 69, and the first respective end of biasers 52, 54 rest against the underside 68 of top portion 12.

Top portion 12 is equipped with respective damper apertures 70, 72, respectively. Apertures 70, 72 are of sufficient dimension to accommodate respective first end portions 20, 22 of respective damper assemblies, and may also accommodate the respective body portions 28, 30 of the damper assemblies 16, 18. Base portion 14 also includes spaced apart mounting apertures 74, 76 which can be used to secure the sensor assembly in place in a vehicle.

Suspended between the top portion 12 and the base portion 14 is a housing 78. Housing 78 is mounted on the underside of top portion 12. Fasteners 80, 82, 84, 86 are provided to secure housing 78 to top portion 12. Housing 78 is configured to receive a permanent magnet 88 in place opposite base portion 14 and adjacent to the underside of top portion 12. Permanent magnet 88 may be mounted to housing 78 by a fastener 90 inserted through an aperture in magnet 88, by an adhesive, within a compartment formed housing 78 and core assemblies 98, 100, or in any other means suitable to maintain magnet 88 opposite to the base portion 14 and adjacent to the underside of top portion 12. Permanent magnet 88 has a length, width and height, all of which are chosen to be accommodated a cavity in housing 78. Permanent magnet 88 generates a magnetic field of sufficient strength to enable of sensor 10. Permanent magnet 88 may be of any geometry, and can be, for example, U shaped or rectangular. If permanent magnet 88 is U shaped, the legs of the U may extend a predetermined length to extend through openings in housing 78 as will be described in relation to core assemblies 98, 100.

In the embodiment shown, the sensor assembly 10 includes core assemblies 98, 100 mounted in housing 78 adjacent either side 102, 104 of permanent magnet 88. Core assemblies 98, 100 may be a ferro-magnetic conductive material that contacts permanent magnet 88 at one end and conducts the magnetic field of permanent magnet 88 to direct it along the length of each core assemblies 98, 100. One or both of core assemblies 98, 100 may be a magnet by itself or conduct a magnetic field. Housing 78 secures core assemblies 98, 100 in place in housing 78 by a compression fit as at recesses 106, 108. Core assemblies 98, 100 have respective first ends 110, 112 and second ends 114, 116, separated by a respective body 118, 120, having a length. Core assemblies 98, 100 are secured to the underside of top portion 12 by respective fasteners 126, 128, extending through apertures in top portion 12. Core assemblies 98, 100 extend from the underside of top portion 12 through the housing 78 at recess openings 134, 136 respectively. Neither housing 78 nor core assemblies 98, 100 are in contact with base portion 14. Housing 78 is spaced apart from base portion 14 by a first gap distance 154, which is greater than the first gaps distance 156, 157 between the respective second ends 114, 116 of bodies 118, 120 of core assemblies 98, 100 and base portion 14. Coils 158, 160 are shown slidably mounted on respective bodies 118, 120 of core assemblies 98, 100. Coils 158, 160 are of a conventional sort and construction, having winding formed of electrically conductive wire of a sufficient number to sense a change in the magnetic flux field and convert the detected change into a voltage provided to a sensor circuit to determine whether there is a blast, collision, or impact event in a manner to be hereinafter described. While two coils 158, 160 are shown, those skilled in the art understand that a single coil having sufficient sensitivity to changes in magnetic flux can be used. Coils 158, 160 are electrically connected at one end 164, 146 together and the second end of coils 158, 160 are connected to 166, 168, respectively, in FIGS. 1 and 170, 172, respectively, in FIG. 2A for connection to a sensor circuit board to activate safety systems in the vehicle, as will be hereinafter described. In this embodiment, connectors 170, 172 are provided so that the coils 158, 160 can be connected to the fasteners and to the system as will be described in relation to FIG. 4. In various embodiments, the wires from the coils pass through housing 78 and directly to the system circuit without the need for the connector fasteners. Housing 78 may be equipped with front and rear plates 174 and 176, respectively, secured with fasteners to close the internal cavity of the housing.

Figure 3:
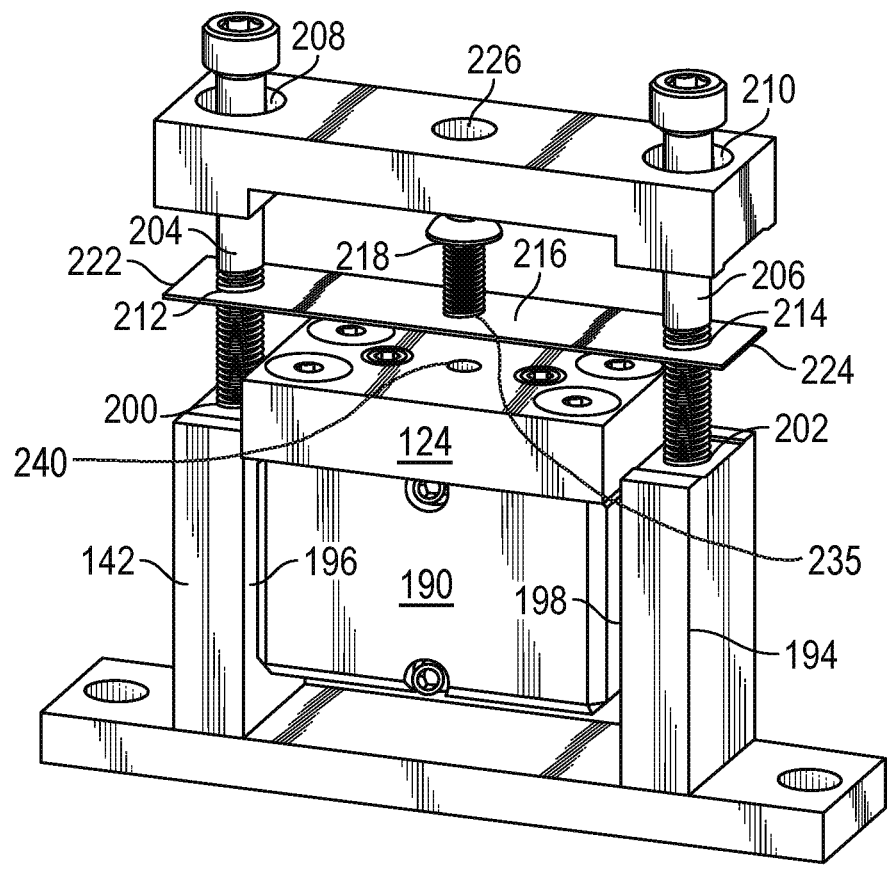
FIG. 3 shows a front perspective view of another sensor according to one or more embodiments.
Figure 4:
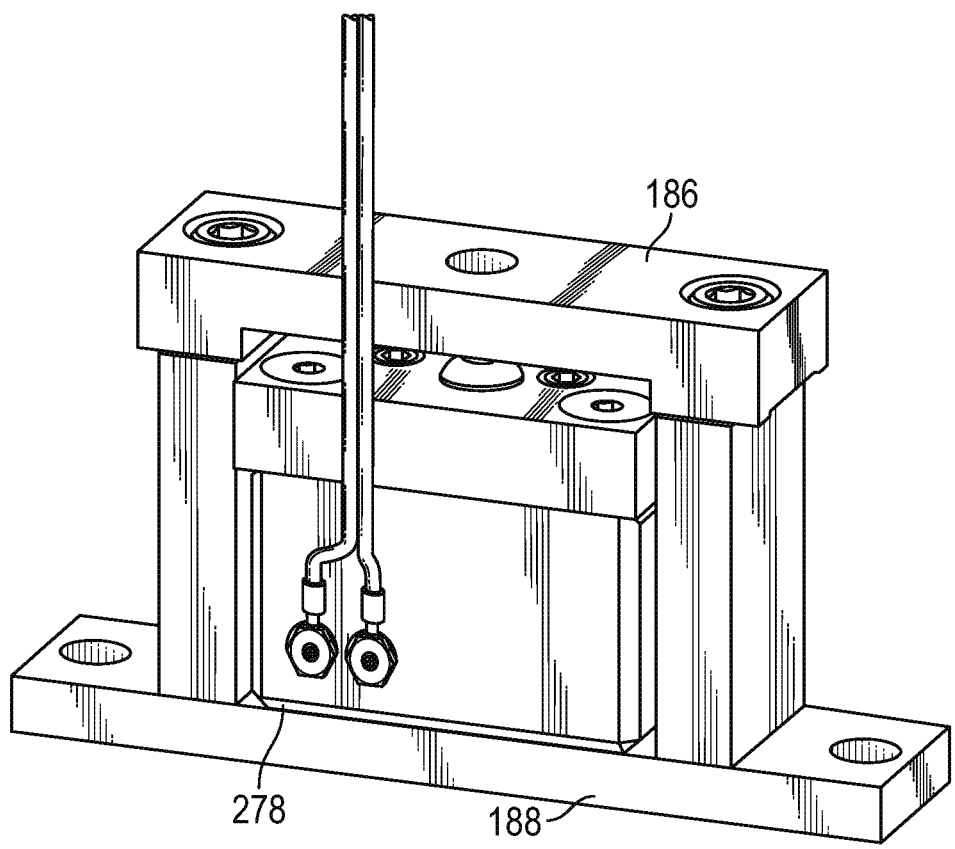
FIG. 4 show a rear perspective view of the sensor of FIGS. 2 and 3 according to one or more embodiments.

Turning to FIGS. 3 and 4, there is shown another embodiment of the sensor assembly. In this embodiment, the top support 186 and base plate 188 are in spaced apart relation. Housing 190 is equipped with supports 142, 194 to hold housing 190 and core assemblies in spaced apart relationship from base plate 188. Housing 190 is also not in contact with supports 142 and 194, there being a housing side gap 196, 198 between housing 190 and respective supports 142, 194. Short top portion 124 is fastened to the housing in a similar way depicted in FIGS. 1 and 2 and described above. Housing 190 houses core assemblies, permanent magnet, and coils depicted in FIG. 1 and described above. Threaded fastener 218 passes through aperture 226 and aperture 235 and fastens biaser 216, which is a band spring, to short top portion 124 through threaded aperture 240. Fasteners 204 and 206 are fitted through apertures 208, 212, 200 and 210, 214, 202, respectively, and secure top support 186, biaser band spring 216, supports 142, 194 to base plate 188. Biaser 216 is positioned intermediate between the supports and short top portion 124. Threaded fastener 218 is intermediate ends 222, 224 of biaser 216. In a blast or severe collision event, a signal is generated by the coils, as described above, indicating a blast event has occurred. If the signal meets a minimum threshold, it may cause the safety systems to be activated and that a "request assistance signal" is transmitted through the CAN and out through an antenna on the vehicle to request assistance.

In all embodiments, it would be common to provide a plurality of sensors assemblies throughout the vehicle. The sensors assemblies would commonly be placed underneath the vehicle seats, connected to structural pillars provided under the floor of a vehicle, provided in the rear or front of the vehicle, provided on the side walls of the vehicle or any other location within the vehicle having a strong structural element to serve as such a connection locale.

Figure 2A:
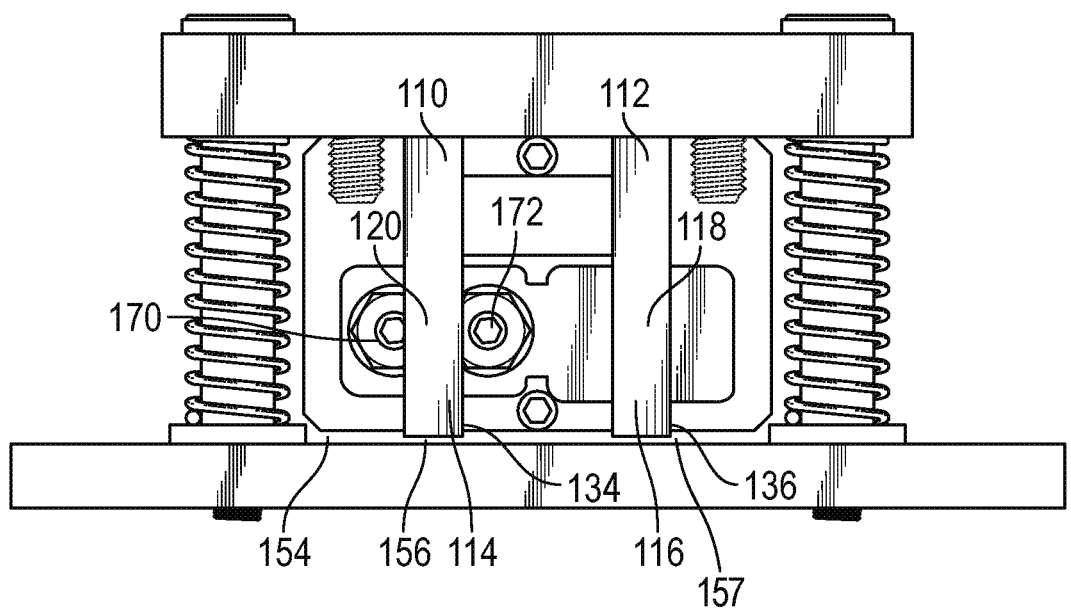
FIG. 2A is a view of the sensor of FIGS. 1 and 2 without the coils.

The sensor assembly 10 as described is designed to operate without external electrical power. The sensor generates a voltage output using Faraday's law by means of at least one coil. Since the permanent magnet provides a constant magnetomotive force, a change in magnetic flux is caused by a change in the reluctance of the magnetic circuit which occurs in general two modes: before gap closure where the reluctance of the core assembly stays constant and after gap closure Villari effect starts. The sensor described herein deploys safety systems long before gap closure. Reliance on gap closure will yield detection comparatively slowly. As previously stated, FIG. 2A illustrates a small housing gap 154 between the mounting or housing body 78 (or 190) and the base portion 14 (or 188). This gap may be in the range of from about 0.050 inch to about 0.100 inch. An even smaller first gap 156, 157 is provided between the bodies 118, 120 of core assemblies 98, 100 and base portion 14 (or 188).

In the event of a blast or severe collision, core assemblies 98, 100 move toward base portion 14 in response to acceleration applied to the base portion 14 (or 188) caused by blast, collision, or impact event. Since sprung mass including core assemblies 98, 100, permanent magnet 88, housing body 78, and top portion 12 (or short top portion 124) is connected to unsprung mass of base portion 14 (or 188) by flexible biaser 52, 54 (or 216), sprung mass cannot follow unsprung mass of the base portion 14 (or 188) immediately and inertia force acts on the unsprung mass and pushes the sprung mass downward toward base portion 14 (or 188) when the acceleration is upwards. The resulting decrease in gap 156, 157 causes a change in the magnetic reluctance of the air gap 156, 157. Coils 158, 160 detect change in flux in response to change in magnetic reluctance of the air gap and generates voltage resulting in deploying safety systems of the vehicle.

After a gap closure, i.e. after bodies 118, 120 of core assemblies 98, 100 come into contact with base portion 14, further compression of the bodies of 118, 120 of core assemblies 98, 100 causes a further reluctance change according to the Villari effect, or inverse magnetostriction effect, which states that when stressed, a material experiences a change in magnetic permeability and thus a change in magnetic reluctance. Voltage output of the sensor in response to change in reluctance according to the Villari effect is orders of magnitude smaller compared to voltage output of the sensor in response to change in reluctance of the air gap. The safety system described herein is deployed within half a millisecond of the event. Further, the reluctance of the core assembly and the base must stay constant to eliminate any adverse effect on the output voltage and time to deploy the safety system.

Permanent magnet 88 positioned within the sensor body 78 generates an attractive force between the bodies 118, 120 of core assemblies 98, 100 and base portion 14 (or 188). It is assumed that the attractive force is equivalent to the attractive force of permanent magnet 88. It is also assumed that there is a friction force which acts between the sprung and un-sprung masses. The sensor assembly 10 and the system must activate the safety systems of the vehicle such as airbags within a half a millisecond to reach the specifications in a blast or collision event before the gap closure.

The system must deploy safety systems of the vehicle only when the vehicle is subjected to an underbody blast or severe collision, or an incoming weapon and must avoid false deployments. In one embodiment of the sensor and the system, a weight sensor (or occupant switch or occupant sensor) is also provided on the seat which will sense if a user is sitting within the seat. The seat safety system of that seat will not be activated if there is no occupant within that vehicle seat. Furthermore, in additional embodiments, the system can be turned off to avoid false deployments completely and to conserve battery power if the vehicle is not in a hostile environment. Certain vehicle mounted guns may create large accelerations when they are fired. Furthermore, in additional embodiments, the sensor system avoids false deployments when a vehicle mounted weapon is fired.

The system has self-diagnostics capabilities and may communicate results to an onboard computer or vehicle system wirelessly. In other embodiments, the system may be wired to the computer.

In one embodiment, the sensor detects if a blast has occurred on or near the vehicle. The system is further adapted to detect severe vehicle collision events including hits by incoming weapons. If the system determines that a blast or severe collision has occurred, the system supplies power to safety systems within the vehicle. These safety systems may include airbags, seatbelts, headrests, or other safety systems. Additionally, a signal may be sent to a third party indicating that a blast has occurred.

In the present embodiments, no power supply is required for the sensor. The elimination of a requirement for a power supply negates any drift within the sensor. More importantly, operation of the sensor will not be compromised of power interruption. The system electronics and energy storage module are connected to the vehicle power. Sensor circuit is powered by onboard energy storage module. The system is turned on by the vehicle power with delayed turn-off capability in case a blast, collision, or impact event causes a power interruption.

The sensor has a first position (before gap closure) and a second positon (after gap closure). Magnetomotive force (mmf) is treated analogously to electromotive force (emf), and magnetic reluctance is analogous to electrical resistance. A magnetomotive force causes magnetic flux flow through reluctances similar to an electromotive force causing electrical current flow through resistances.

It is assumed that prior to closing gaps 156, 157, the reluctances associated with the magnetic circuit materials (the reluctance of the magnet 88, the reluctance of the bodies 118, 120 of respective core assemblies 98, 100, and the reluctance of the base plate or base portion (14 or 188) are constant. Also the mmf of the permanent magnet 88 is assumed to be constant. Thus, the only variability in the system is assumed to be due to the reluctances associated with the air gap and these are dependent on the distances of gaps 156, 157.

The following table illustrates some of the advantages of the sensor of the instant application compared to accelerometers:

TABLE 1

|  | Sensor | Accelerometer |
| --- | --- | --- |
| Requires Electrical Power Supply | No | Yes |
| Requires Signal Amplification | No | Yes |
| Requires Filtering | No | Yes |
| Signal Drift | No | Yes |

TABLE 1-continued

|  | Sensor | Accelerometer |
| --- | --- | --- |
| Output effected by Temperature Significantly | No | Yes |
| Effected by High Frequency Surface Vibrations | No | Yes |
| Delicate | No | Yes |
| Smaller | No | Yes |
| Acceptable response time to blast events | Yes | Yes |
| Heavier | Yes | No |
| Always Zero Volt Output under Static Conditions | Yes | No/Maybe |
| Cost Effective | Yes | No |
| Sturdy, can be mounted very close to blast | Yes | No/Maybe |
| Not effected by Humidity/Moisture | Yes | No/Maybe |

As is apparent from Table 1, the sensor has many advantages over accelerometers commonly used in civilian vehicle safety systems and represents an advance, especially in blast detection in military vehicle applications where durability and reliability are paramount.

Figure 5:
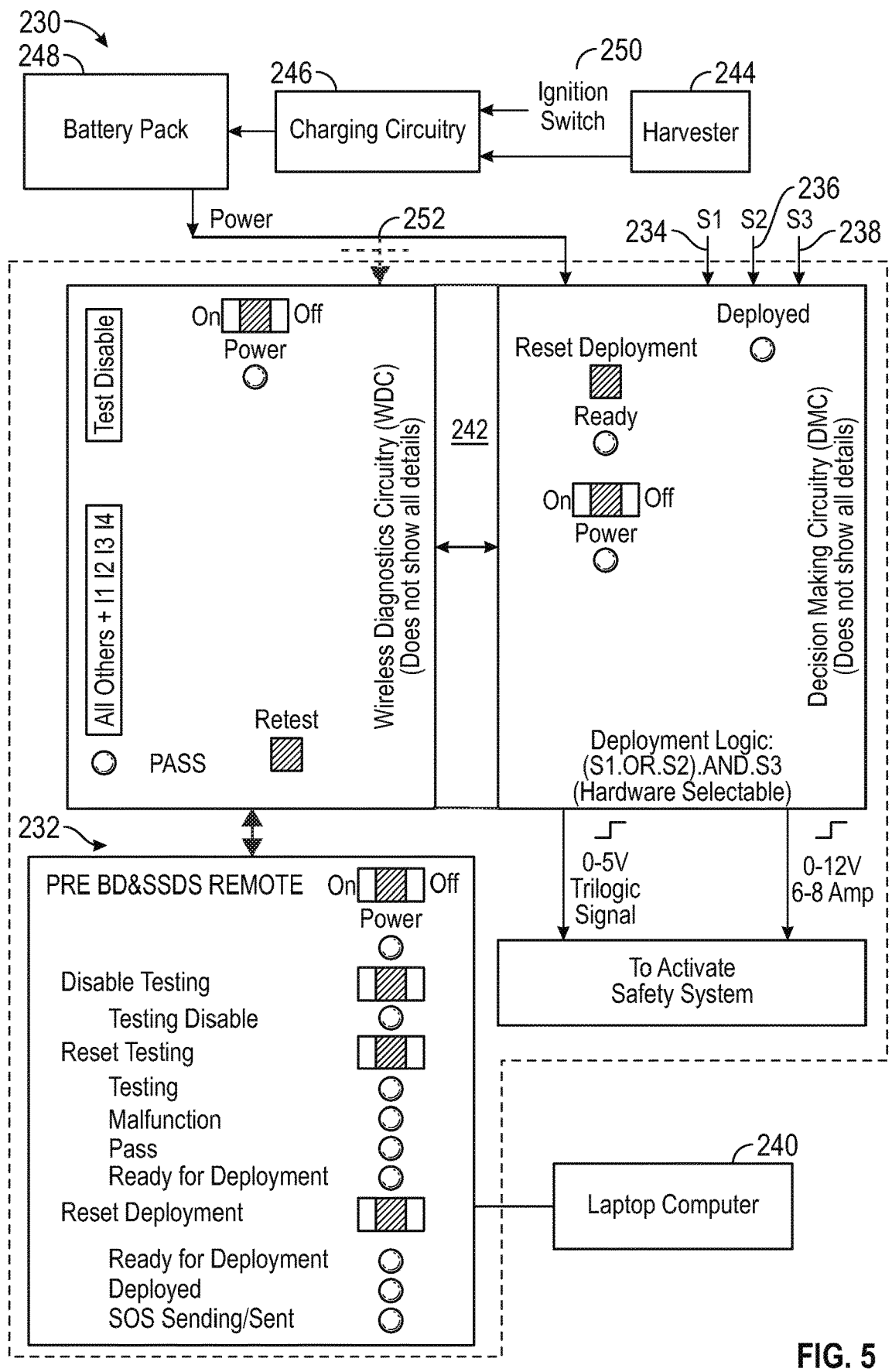
FIG. 5 depicts a schematic representation of a system according to one embodiment.

FIG. 5 depicts a system using a sensor of the present application. The system 230 includes a remote controller 232, such as an electronic control module having memory with instructions to control various operations of the safety system and other system or subsystems associated therewith, such as the blast detection sensors and safety systems associated with the vehicle. Various sensors S1, S2, and S3 may be in electrical communication with the decision making circuitry (DMC) of the Sensor Circuit 242 via input ports 234, 236 and 238. The controller may include a microprocessor unit (MPU) in communication with various computer readable storage media via a data and control bus. The computer readable storage media may include any of a number of known devices which function as read only memory, random access memory, and non-volatile random access memory. A data, diagnostics, and programming input and output device, such as a laptop computer 240, may also be selectively connected to the controller via a plug to exchange various information there-between. The data diagnostics device may be used to change values within the computer readable storage media, such as configuration settings, calibration variables, and others. The Sensor Circuit 242 executes the method of FIG. 6 as described below.

The system also includes an energy harvester 244 (which may be the sensors themselves), and a charging circuit 246 that takes energy from the harvester and vehicle power through ignition switch 250 and charges the onboard battery 248. Power input from ignition switch of the vehicle 250 also turns the system on so that the system may operate in the presence of electrical power from the vehicle. When the vehicle is not powered, such as, for example, when the ignition switch is not engaged or power from vehicle is disrupted by a blast or a collision event, the onboard battery pack 248 may supply power to the Sensor Circuit 242 as shown at 252 for a predetermined period of time, say, for example, 5 minutes, after which the system turns itself off. In this regard, the system as described may be equipped with a "delayed turn off" capability.

As depicted, the system includes multiple sensors potentially may use one of the sensors S3 238 as a blast fuse or similar device, which generates a step change in voltage, to independently confirm the blast. The Sensor Circuit includes a decision making circuit (DMC) and a diagnostic circuit (WDC). The diagnostic circuit (WDC) can then transmit data to a computer to provide an indication to the user. The system may be particularly advantageous because it has the capability to confirm the blast and to avoid false deployment of the vehicle safety system. Specifically, the system may include a step voltage generating device such as a blast fuse (a simple electric circuit) to detect that a blast has actually taken place. If there is a blast, the blast fuse will be completely blown away. If the blast fuse has been completely blown away, the system will confirm that an actual blast has taken place and that the sensor output is not caused by the firing of an on board weapon.

In some embodiments three (3) sensors are used where two are the blast sensors as discussed herein and the third is a blast fuse or similar devices. The blast fuse or similar devices essentially creates a step change in voltage. Other embodiments may include four or more blast sensors and one or two blast fuses. The system may function as a central triggering unit in those embodiments which include more than four sensors. The blast fuse may also be called an "indicator."

Figure 6:
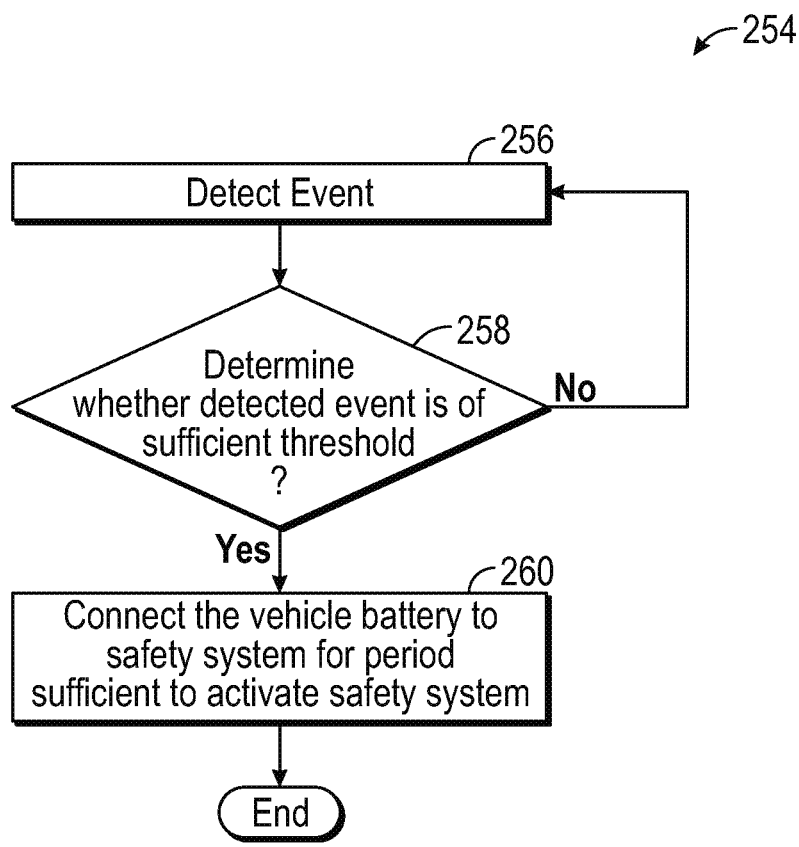
FIG. 6 is a flowchart depicting one method to operate the system using the sensor.

FIG. 6 is a schematic flowchart depicting one method 254 to operate the sensors and system. Specifically, step 256 detects a blast, collision, or an impact event. In this step, it is essential that at least two of the sensors indicate that a blast, collision, or impact event has occurred that exceeds a minimum threshold. In this embodiment, sensor S1, S2, and S3 are provided. S1, S2, or S3 may detect a blast, collision, or impact event. Step 258 determines whether the input from at least one of S1 or S2 and the input from S3 indicate that a blast, collision, or impact event has occurred that exceeds the minimum threshold. If the input from at least one of S1 or S2 and the input from S3 indicate that a blast, collision, or impact event has occurred, then a minimum threshold has been reached and the method proceeds to step 260. If the input from at least one of S1 or S2 and S3 do not indicate that a blast, collision, or impact event has occurred, then it is determined that the event is not sufficient to trigger a response, and the method loops back to step 256. Otherwise, control proceeds to Step 260 and activates the safety systems (usually through pyrotechnic devices) and resets itself to detect next event and, optionally, generating a request for assistance signal and broadcasting the signal itself or through the Common Area Network (CAN) of the vehicle.

The above sensors and the system may also be used in a variety of civilian applications such as vehicles, gates, door locks, windows, home security systems, vehicle security and safety systems. Safety systems may include airbags, seatbelts, or other specialty safety systems of the vehicle. In addition to military vehicles, the sensor and the system described herein have a wide variety of other applications in military sectors. They include landing and take of planes, protection of buildings and bridges, monitoring machinery, harvesting energy from vibrating structure such as bridges and vehicles.

These applications would use the same or similar principals and sensors such as described above be detecting some sort of disruption.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sensor comprising:
   a base, a body, a coil, and a permanent magnet, the body disposed adjacent to the permanent magnet, the coil having a sufficient number of windings to detect a change in magnetic flux circulating in the permanent magnet and the body; and
   a bias spring configured to control displacement of the body relative to the base;
   wherein in a first position, the body is spaced apart from the base, defining a first gap distance between the base and the body, and
   in a second position, the body and the base overcome the bias spring and displace toward each other in response to an acceleration exceeding a predetermined threshold, and
   wherein a voltage output is generated by the coil when the body and the base are in the second position.

2. The sensor of claim 1, further including a housing receiving the permanent magnet, the housing spaced a second gap distance from the base, the second gap distance being greater than the first gap distance, the housing configured to be displaced in response to the acceleration, wherein the acceleration causes movement of the body, the coil, and the permanent magnet relative to the base.

3. The sensor of claim 1, the sensor configured to communicate with a sensor circuit, the sensor circuit configured to detect whether the acceleration exceeds the predetermined threshold, the sensor circuit further configured to generate a step voltage triggering signal and to provide power to deploy at least one safety system of a vehicle when the acceleration exceeds the predetermined threshold.

4. The sensor of claim 1, wherein the sensor is at least one of temperature and humidity compensated or any signal from the sensor is not subject to sensor signal drift.

5. The sensor of claim 1 wherein the bias spring is configured to resist an attractive force between the body and the base caused by the permanent magnet.

6. The sensor of claim 1, wherein movement of the body relative to the base generates electrical energy stored in a power storage unit.

7. The sensor of claim 1, wherein the sensor is powered by vehicle power and onboard battery power, wherein if the vehicle power is disrupted, the onboard battery powers the sensor.

8. The sensor of claim 1, wherein the sensor is configured for operation in a master and slave system to generate a central triggering signal and to deploy a safety system wherein the safety system includes at least one of airbags, seatbelts, or headrests.

9. A system to detect a blast, collision or impact event and to deploy at least one safety system of a vehicle comprising:
   a sensor, the sensor including:
      a top portion spaced apart from a base;
      a permanent magnet in proximity to the top portion;
      a plurality of core assemblies including a body in magnetic communication with the permanent magnet and in contact with the top portion and extending toward the base and positioned a first distance from the base, at least one of the plurality of core assemblies having a coil to detect a change in flux above a first predetermined threshold in response to displacement of the at least one core assembly upon application of an acceleration of the base, the coil converting the change in flux to an electrical signal; and at least one bias spring configured to control movement of the core assemblies and the permanent magnet in response to the acceleration, the sensor in communication with a sensor circuit, the sensor circuit configured to determine if a voltage of the electrical signal has reached a second predetermined threshold, indicating that the event has occurred, the sensor circuit configured to generate a step voltage triggering signal, providing power to deploy the at least one safety system when the event has occurred, an energy harvester configured to harvest energy from the sensor;

an onboard battery pack configured to provide power to the sensor circuit;

a charging circuit configured to charge the onboard battery pack from one of vehicle power or power generated by the energy harvester; and a remote control circuit configured to control the sensor circuit.

10. The system of claim 9, wherein the sensor further includes a housing at least partially enclosing the permanent magnet, and the at least one core assembly, the housing spaced a second distance from the base.

11. The system of claim 9, wherein the sensor circuit is configured to output a step voltage triggering signal and to provide power to deploy at least one safety system when the event has occurred.

12. The system of claim 9, further including at least three sensors connected to the sensor circuit, wherein one of said sensors is configured to generate a first signal in response to the event, wherein the sensor circuit is configured to determine whether a second signal from one of the remaining sensors generated in response to the event agrees with the first signal to indicate detection of the event and to deploy the safety system of the vehicle.

13. The system of claim 9, wherein the system is powered by at least one of vehicle power and the onboard battery pack, wherein if the vehicle power is disrupted, the system is powered by the onboard battery pack.

14. The system of claim 9, wherein the system includes a master system and a slave system that responds to a central triggering signal and deploys the safety systems in the vehicle.

15. The system of claim 9, wherein at least one sensor is positioned at least one of below a vehicle seat, inside a vehicle, or outside of the vehicle.

16. The system of claim 15, wherein the at least one sensor includes a weight sensor, and deployment of a vehicle seat safety system occurs in response to a signal from the weight sensor.

17. A method to operate a vehicle safety deployment system having a sensor having a base, a fixed magnet, and a core, and a coil in magnetic communication with the fixed magnet, the core in spaced apart relation from the base, the core moveable relative to the base, a bias spring configured to control displacement of the core relative to the base; the coil detecting changes in magnetic flux to generate an output signal in response to relative displacement between the core and the base, the sensor configured to communicate with a sensor circuit, the sensor circuit powered by one of the coil and the fixed magnet, vehicle power, or an onboard battery pack, the onboard battery pack charged by one of the vehicle power or power generated by an energy harvester obtaining energy from the sensor, the system further having a remote control circuit controlling the sensor circuit, the method, comprising:

detecting an acceleration event in accordance with relative movement between the core and the base overcoming the bias spring;

determining whether the event is above a predetermined threshold in accordance with the output signal; and deploying at least one vehicle safety system if the event is above the predetermined threshold.

18. The method of claim 17, wherein the system includes at least three sensors wherein one of the sensor is a step voltage signal generating device configured to generate a step voltage signal in response to the event, wherein the sensor circuit determines whether a signal from one of the remaining sensors generated in response to the event agrees with the step voltage signal to indicate detection of the event and deploys the at least one vehicle safety system.

19. The method of claim 17, wherein movement of the core changes a magnetic reluctance of an air gap and flux detected by the coil.

20. The method of claim 17, wherein the sensor circuit is powered by both vehicle power and the onboard battery pack, wherein if vehicle power is disrupted, the onboard battery pack provides power to the system.

21. The method of claim 17, wherein the system is configured as a master system and plurality of slave systems, wherein the master system generates a triggering signal in response to the event and the slave systems deploy a plurality of safety systems in a vehicle in response to the triggering signal and the event.

22. The method of claim 17, comprising conducting diagnostic tests on the system and communicating results one of visually or wirelessly to a vehicle system or a computer, and further resetting the system after response to the event is completed.

23. A sensor comprising:

a base, a body, a coil, and a permanent magnet, the body disposed adjacent to the permanent magnet, the coil having a sufficient number of windings to detect a change in magnetic flux circulating in the permanent magnet and the body;

wherein in a first position, the body is spaced apart from the base, defining a first gap distance between the base and the body, and in a second position, the body and the base displace toward each other in response to an acceleration exceeding a predetermined threshold, wherein a voltage output is generated by the coil when the body and base are in the second position, and wherein movement of the body relative to the base generates electrical energy stored in a power storage unit.

24. The sensor of claim 23, further including a housing receiving the permanent magnet, the housing spaced a second gap distance from the base, the second gap distance being greater than the first gap distance, the housing configured to be displaced in response to the acceleration causing the movement of the body, the coil, and the permanent magnet relative to the base.

25. The sensor of claim 23, the sensor configured to communicate with a sensor circuit, the sensor circuit configured to detect whether the acceleration exceeds the predetermined threshold, the sensor circuit further configured to generate a step voltage triggering signal and to provide power to deploy one or more safety systems of a vehicle when the acceleration exceeds the predetermined threshold is determined.

26. The sensor of claim 23 further including at least one of a biaser of a sufficient stiffness to control displacement of the body in response to the acceleration exceeding a predetermined threshold.

27. The sensor of claim 23, wherein a sensor circuit and safety system are powered by at least one of vehicle power and onboard battery power, wherein if the vehicle power is disrupted, the onboard battery power powers the sensor circuit and safety system.

28. A system to detect a blast, collision or impact event and to deploy at least one safety system of a vehicle comprising:
   a sensor, the sensor including:
      a top portion spaced apart from a base;
      a permanent magnet in proximity to the top portion;
      a plurality of core assemblies including a body in magnetic communication with the permanent magnet and in contact with the top portion and extending toward the base and positioned a first distance from the base, at least one of the plurality of core assemblies having a coil to detect a change in flux above a first predetermined threshold in response to displacement of the at least one core assembly upon application of an acceleration of the base, the coil converting the change in flux to an electrical signal;
      at least one biaser of a sufficient stiffness to control displacement of the core assemblies and the permanent magnet in response to the acceleration,
   the sensor in communication with a sensor circuit, the sensor circuit configured to determine if a voltage of the electrical signal has reached a second predetermined threshold, indicating that the event has occurred,
   the sensor circuit configured to generate a step voltage triggering signal, providing power to deploy the at least one safety system when the event has occurred,
   an energy harvester configured to harvest energy from the sensor;
   an onboard battery pack configured to provide power to the sensor circuit;
   a charging circuit configured to charge the onboard battery pack from one of vehicle power or power generated by the energy harvester; and
   a remote control circuit configured to control the sensor circuit.

29. The system of claim 28, wherein the sensor circuit is configured to receive at least one sensor signal and determine whether the event has occurred.

30. The system of claim 28, wherein the sensor circuit is configured to output at least one of a signal or a message that the event has occurred.

31. The system of claim 28, further including at least three sensors connected to the sensor circuit, wherein one of the sensors includes a voltage generating device configured to generate a step voltage in response to the event, wherein the sensor circuit determines whether a signal from one of the remaining sensors generated in response to the event agrees with the step voltage and indicates detection of the event and deploys the safety system of the vehicle.

32. The system of claim 28, wherein the system is powered by at least one of vehicle power and the onboard battery pack, wherein if the vehicle power is disrupted, the system is powered by the onboard battery pack.

33. The system of claim 28, wherein the sensor circuit is configured to conduct diagnostic tests on the system and communicates results visually, to one of a vehicle system or a computer.

34. The system of claim 28, wherein the sensor further includes a housing at least partially enclosing the permanent magnet, and the at least one core assembly, the housing spaced a second distance from the base.

35. The system of claim 34 further comprising a vehicle seat, wherein the vehicle seat includes a weight sensor, and deployment of a vehicle seat safety system of the at least one safety system occurs in response to the electrical signal from the weight sensor.

* * * * *